United States Patent
Sanghavi et al.

(10) Patent No.: US 8,046,331 B1
(45) Date of Patent: Oct. 25, 2011

(54) METHOD AND APPARATUS FOR RECREATING PLACEHOLDERS

(75) Inventors: Mugdha Sanghavi, Pimpri Pune (IN); Kishor S. Ghait, Aurangabad (IN); Andrew Nash, Reading (GB); Laxmikant Vithal Gunda, Pune (IN)

(73) Assignee: Symantec Corporation, Mountain View, CA (US)

( * ) Notice: Subject to any disclaimer, the term of this patent is extended or adjusted under 35 U.S.C. 154(b) by 503 days.

(21) Appl. No.: 11/807,003

(22) Filed: May 25, 2007

(51) Int. Cl.
*G06F 17/30* (2006.01)

(52) U.S. Cl. ............... 707/640; 707/641; 707/E17.032; 715/227; 715/246; 358/1.16

(58) Field of Classification Search .................... None
See application file for complete search history.

(56) References Cited

U.S. PATENT DOCUMENTS

| | | | |
|---|---|---|---|
| 5,873,103 A * | 2/1999 | Trede et al. | 707/204 |
| 6,868,424 B2 * | 3/2005 | Jones et al. | 707/102 |
| 7,140,044 B2 * | 11/2006 | Redlich et al. | 726/27 |
| 7,272,815 B1 * | 9/2007 | Eldridge et al. | 717/101 |
| 7,386,674 B1 * | 6/2008 | Lango | 711/137 |
| 7,437,663 B2 * | 10/2008 | Lakhdhir et al. | 715/234 |
| 7,546,324 B2 * | 6/2009 | Prahlad et al. | 707/204 |
| 2006/0200708 A1 * | 9/2006 | Gentieu et al. | 714/704 |
| 2007/0050489 A1 * | 3/2007 | Dowedeit | 709/223 |

* cited by examiner

*Primary Examiner* — Shyue Jiunn Hwa
(74) *Attorney, Agent, or Firm* — Campbell Stephenson LLP

(57) ABSTRACT

A method and apparatus for recreating placeholders comprising selecting at least one object of information in an archive, determining a source location for the selected at least one object of information, accessing the selected at least one object of information, and recreating a placeholder from the selected at least one object of information.

14 Claims, 2 Drawing Sheets

METHOD AND APPARATUS FOR RECREATING PLACEHOLDERS

BACKGROUND OF THE INVENTION

1. Field of the Invention

The present invention generally relates to a method and apparatus for archiving information. More particularly, the present invention pertains to design and implementation of a method and apparatus for recreating placeholders from objects of information, such as files and/or emails, stored in an archive.

2. Description of the Related Art

Many computer users have large amounts of data which they do not use frequently and do not need immediate access to such infrequently used data. Consequently, such data may be considered as archivable data.

In most cases, there are three phases (or states) associated with any archivable data: online, archived and intermediate. The online state comes into existence when data is available online for fast processing (i.e., access, retrieval and the like from a storage that is directly accessible by the users' computer). On the other hand, when in the archived state, the data is moved to secondary storage such that access to the data results in a delay (i.e., a search of the archive is performed to find the archived file).

Further, when in the intermediate state, the data is moved to a secondary storage, where in the intermediate state, a stub (frequently referred to as placeholder, skeleton, proxy or surrogate) corresponding to the data is present on the primary (or online) storage thereby facilitating simple retrieval of the data, however with some latency. Specifically, a stub may contain basic information to identify the data and also include information indicating the location of the data on the secondary storage device. Thus, a user selects the placeholder and the file represented by the placeholder is retrieved from the secondary storage.

Currently, if a computer crashes, the placeholders are lost and the archived files must be restored to the computer and then re-archived to regenerate the placeholders. Such a process is very time consuming.

Therefore, there is a need in the art for a method and apparatus for recreating placeholders for objects of information without restoring the archived files.

SUMMARY OF THE INVENTION

The present invention comprises various embodiments of a method and apparatus for recreating placeholders comprising selecting at least one file in an archive, determining a source location for the selected at least one file, accessing metadata related to the selected at least one file, and recreating a placeholder for the selected at least one file at the source location.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention is generally directed towards a method and apparatus for recreating placeholders (also referred to as stubs, proxies, skeleton, surrogate or link) for objects of information.

Figure 1:
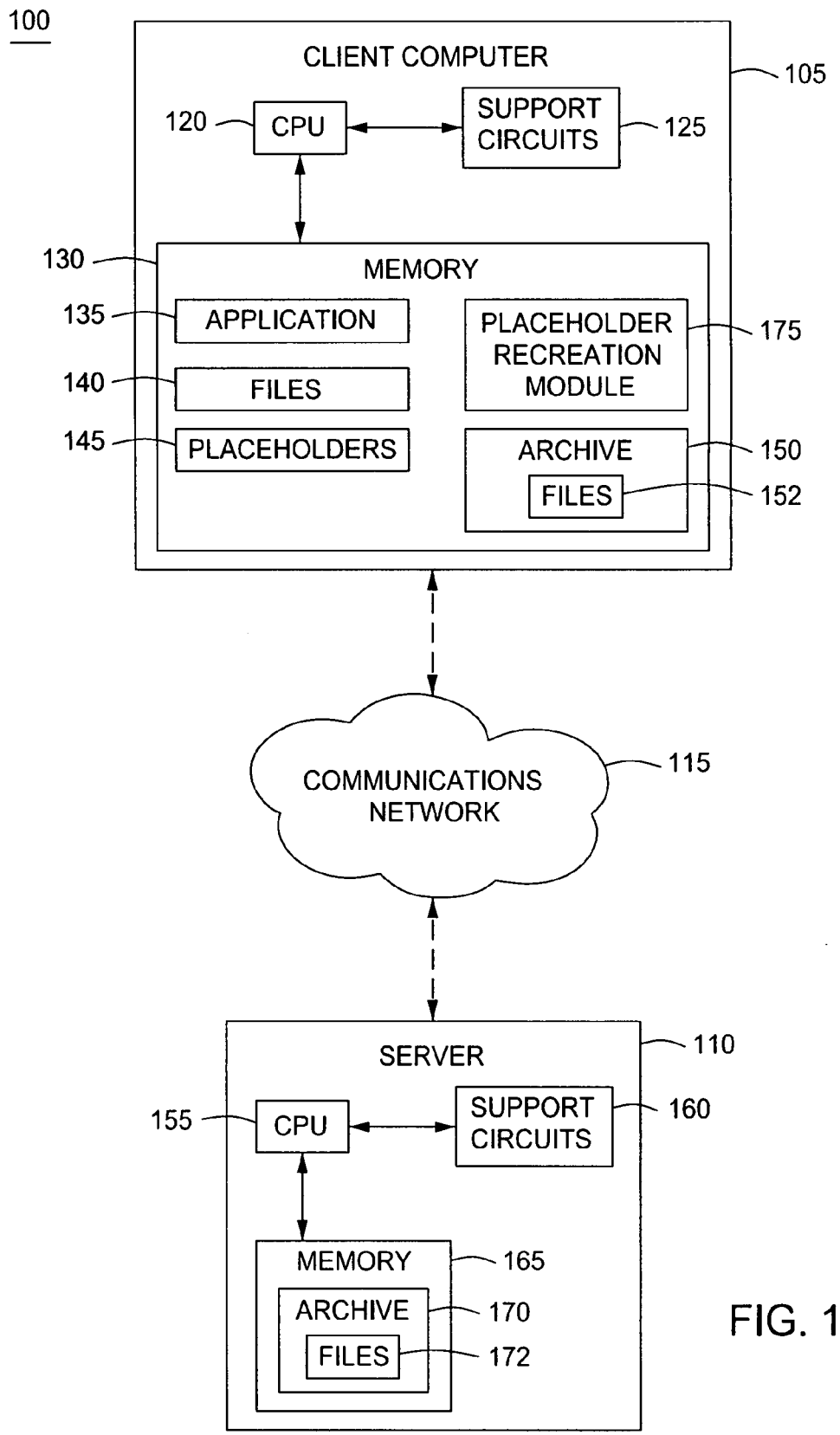
FIG. 1 is a block diagram of an apparatus used to recreate placeholders in accordance with some embodiments of the present invention.

FIG. 1 depicts a block diagram of a computer system 100 used for recreating placeholders from objects of information in accordance with at least one embodiment of the present invention.

The term "objects of information", refers to pieces of information or items of information, such as files, emails, voice mail, calendar events, tasks, messages and the like, created by an application and stored by a fileserver or e-mail software e.g., an EXCHANGE mailbox.

The system 100 consists of a client 105, a server 110 and a communications network 115. The client 105 and server 110 are coupled to each other via the network 115. Optionally, the system 100 may consist of at least a plurality of clients 105 and/or servers 110 coupled to one another through the network 115. As described in detail below, the system 100 facilitates recreation of at least one placeholder 145 from the objects of information e.g., files 152 or 172 stored in an archive 150 (local archive) or 170 (remote archive).

Client 105, in essence, a computing device comprises a central processing unit (CPU) 120, support circuits 125 and a memory 130. The CPU 120 may comprise one or more commercially available microprocessors or microcontrollers that facilitate data processing and storage. The support circuits 125 facilitate operation of the CPU 120 and comprise at least one of clock circuits, power supplies, cache, input/output circuits, and the like. The memory 130 comprises at least one of read only memory, random access memory, disk drive storage, optical storage, removable storage, and the like. The memory 130 stores at least one application 135, files 140, placeholders 145, a placeholder recreation module 175 and an archive 150 containing archived files 152.

Although the invention may be used to recreate the placeholder 145 from a locally stored archive, such as archive 150, in many instances, the archive is remotely stored in another computer, such as a server 110. The server 110 comprises a CPU 155, support circuits 160 and memory 165. The CPU 155 may comprise one or more commercially available microprocessors or microcontrollers that facilitate data processing and storage. The support circuits 160 facilitate operation of the CPU 155 and comprise at least one of clock circuits, power supplies, cache, input/output circuits and the like. The memory 165 comprises at least one of read only memory, random access memory, disk drive storage, optical storage, removable storage and the like. The memory (or portions thereof) may be located locally or remotely with respect to the CPU 155. The memory 165, for purposes of describing embodiments of the present invention, comprises an archive 170 for storing archive files 172.

As used herein, the term "application" refers to a shorter form of an application program. An application program is a program designed to perform a specific function directly for the user or, in some cases, for another application program. Applications use the services of the computer's operating system and other supporting applications. For example, and in no way limiting the scope of the present invention, the application 135 may be a fileserver, an e-mail program or database program.

The term "files", as used herein, refers to files that are created by the application. For example, .pst is a filename extension used with certain MICROSOFT WINDOWS products. When MICROSOFT EXCHANGE Server is used, the messages, calendar, and other items are delivered to and stored on the server 110. On the other hand, when the server 110 is not used, the messages, calendar, and other items are delivered to and stored locally in memory 130 in a Personal Folders (.pst) file. It must be noted here that the letters pst stand for Personal Storage Table. For instance, if a user creates messages, appointments, tasks, and journal entries using an e-mail program such as MICROSOFT OUTLOOK, the program saves the information in a personal folders (.pst) file on the computer.

As used herein, the term "archival product" refers to an archival software or computer programs designed to facilitate the management of archives or computer programs designed to extract non-current records from an online system and transfer them to offline (e.g., storage in a server 110) or near-line storage (e.g., storage in a local archive 150 in memory 130).

In some scenarios, users may have large amounts of data which they do not want to delete, but may want to reference in the future. However, they do not need immediate access to the data. Such data may be considered as archivable data. Typically, archivable data, sometimes referred to as archival data, permanent data, reference data, fixed data or fixed-content data, is broadly defined, as data that under normal circumstances is not subject to change. More specifically, archivable data is sometimes defined as data that probably undergoes partial or no further processing, is neither regularly displayed nor subjected to alteration. Thus, archival data is generally stored for long periods of time. Archival data (or fixed content data) comprises data created by an assortment of storage intensive applications including, but not limited to, critical business applications data, complex legal and reference documents, medical data, email attachments, blueprints, satellite imagery, security surveillance information, check images, broadcast content, and the like which are seldom altered once created.

In such aforementioned scenarios, users opt to archive the objects of information, such as files, emails and the like in accordance with the principles of the present invention. Operationally, the files 140 are those that are created by the application 135. Further, when the files 140 are archived using an archival product, the placeholders 145 are created in place of the existing files 140. More specifically, when the files 140 are archived into either archive 250 or archive 270, the files 140 are migrated or moved to the archive 150 or 170 (i.e. an archive folder). In order to facilitate access to the archived files stored in either archive 150 or 170, the placeholders 145 are created and placed in the memory 130 of the client 105.

A placeholder 145 is a stub file that replaces the contents of the file 140 migrated into the archive 150 or 170. The placeholder 145 includes at least an archive identifier, an item identifier and a checksum. The placeholder 145 occupies less space in comparison to the file 140. The checksum is generally calculated from the file 140 during archiving. The placeholder 145 can be selected to retrieve the information associated with the placeholder by using the archive identifier, the item identifier and the checksum to find and access the file 140 from the archive 150 or 170.

Operationally, when the placeholder 145 is accessed with the intention of performing a certain storage operation, such as a read or write operation, the system call (or a read/write request) is trapped by a software and a data retrieval process (sometimes referred to as de-migration or restore) is completed prior to satisfying the request. De-migration is often accomplished by inserting specialized software into the input/output (I/O) stack to intercept read/write requests. The file 140 is usually copied back to the original primary storage location from secondary storage (archive) and then the read/write request is processed as if the files 140 had not been archived. The effect is that the user sees and manipulates the files 140 as the user normally would, except experiencing a small latency initially when the de-migration occurs.

As used herein, the term "checksum" refers to a hash, which is a number calculated on the basis of the contents of a file; it is used to uniquely identify the file. The checksum is a mathematical value used in a simple error-detection method to verify data contained in the file. Specifically, a checksum is a form of redundancy check, a simple way to protect the integrity of data by detecting errors in data that are sent or migrated or moved from a source to a destination location or vice-versa. It works by summing the basic components of a message in an email or data/contents in a file, typically the asserted bits, and storing the resulting value. The same operation on the data can be performed during later use to compare the result to the authentic checksum and (assuming that the sums match) conclude that the message was probably not corrupted.

The term "placeholder", as used herein, refers to a proxy, surrogate or stub for an object of information, such as files, emails and the like. In accordance with embodiments of the present invention, the placeholder can be rebuilt using all the information from the archive without restoring all the files from the archive. This, in turn, facilitates restoration of data association with applications, such as fileserver, mailbox and the like. In accordance with the present invention, the placeholders for the objects of information can thus be recreated from the information in the archive.

As used herein, the term "archive" refers to a collection of objects (or items) of information. Typically, an archive is a collection of computer files that have been packaged together so that more hard disk storage can be made available to a user. More specifically, an archive can include a simple list of files or files organized under a directory or catalog structure depending on how a particular program supports archiving. An archive provides the ability to store and index data on a long term basis. The archive generally contains details of every object (or item) of information archived and its relation to other objects in the archive. It also typically stores information, such as the source of the item, its size, date and such other properties. All this information from the archive can be used to rebuild the placeholders. For instance, on personal computers with the WINDOWS operating system and WINDOWS.

In accordance with some embodiments, the archive 150 contains at least a plurality of objects of information 140. For example, and by no way of limitation, these objects of information 140 in the archive 150 are selected from a group consisting of files, emails and the like. The archive 150 or 170 contains information about each file 140 stored therein as an archive file 152 or 172.

In certain embodiments, the information in the archive 150 or 170 includes metadata. In certain other embodiments, the information in the archive 150 or 170 includes a plurality of types of metadata. More specifically, the types of metadata belong to a set of metadata classes including descriptive metadata, structural or control metadata and guide metadata. By way of example, and in no way limiting the scope of the present invention, the plurality of types of metadata comprises at least one or relational database metadata, data warehouse metadata, business intelligence metadata, general IT metadata, IT metadata management products, file system metadata, image metadata, program metadata, document metadata, metamodels, strange metadata, digital library metadata, geospatial metadata and the like.

Further, the metadata of a given type corresponds to and forms part of each archive file 152 or 172 stored in the archive 150 or 170. Particularly, the metadata contains information such as, a source of the file 140, a size of the file 140, a date of creation of the file 140, a date of creation of the file 140, a date of modification of the file 140, a date of last access of the file 140, a filename of the file 140, a time of creation of the file 140, a time of last modification of the file 140, a time of last access of the file 140, a set of files 140 stored as a result of some operation, and the like.

Upon failure of the client computer 105, e.g., disk drive failure, the memory 130 will be restored. In other situations, one or more placeholders may be deleted and a user may wish to restore the deleted placeholders. One embodiment of the present invention is used during such restoration process to regenerate the placeholder 145 without restoring the archived files 152, 172. During restoration, the placeholder recreation module 175 is launched to perform placeholder recreation as discussed below with reference to FIG. 2.

Figure 2:
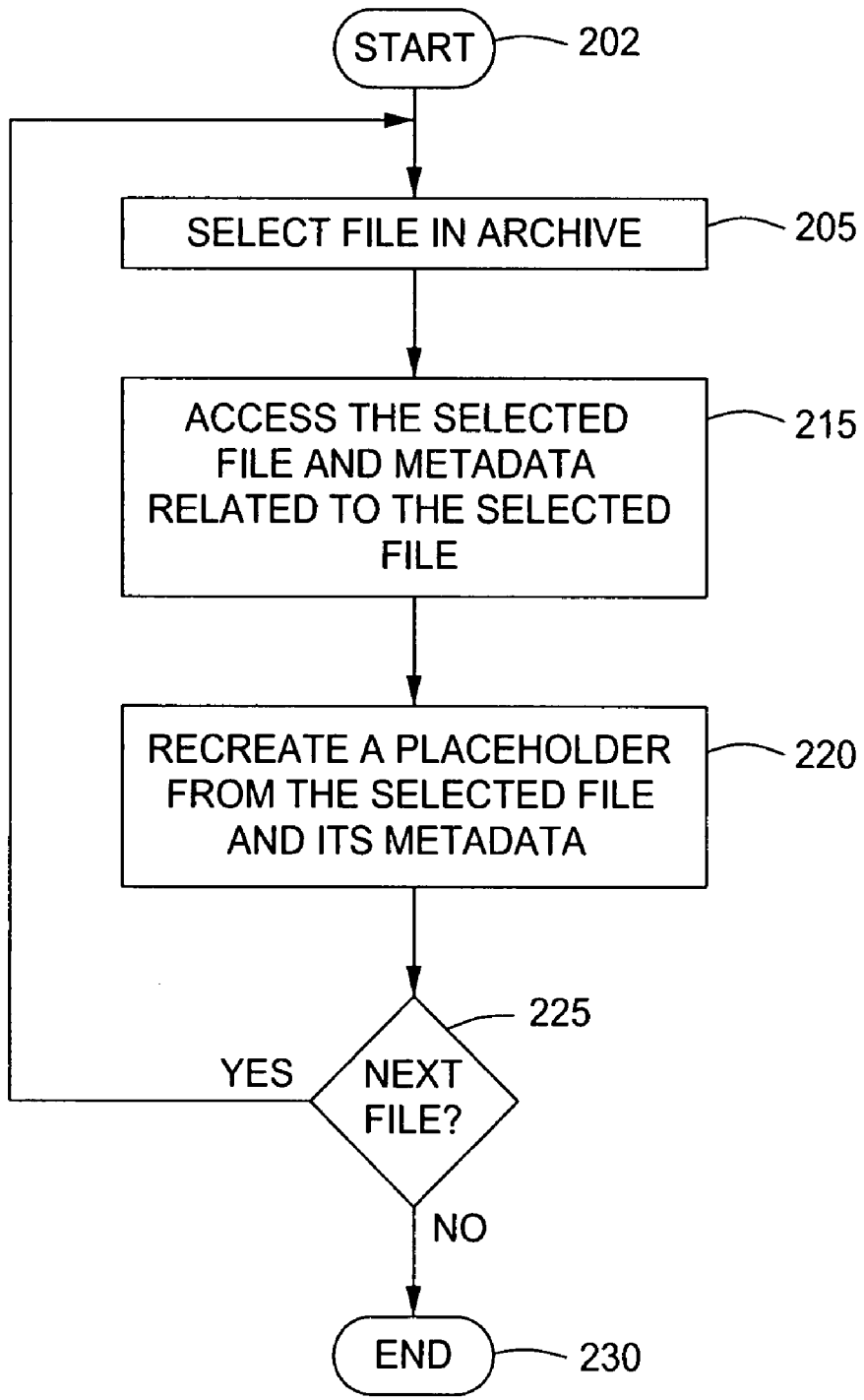
FIG. 2 depicts a flowchart of a method for recreating placeholders from files in an archive in accordance with the principles of the present invention.

FIG. 2 depicts a flowchart of a method 200 for recreation of placeholders from archived files in accordance with one embodiment of the present invention.

The method 200 begins at step 202 and proceeds to step 205 where the method selects at least one file in the archive. The file comprises metadata as well as user data such as email, calendar events, tasks, application data and the like. In one embodiment, the step of selecting at least one archived file is accomplished by a user selecting the files for which placeholders have to be recreated. Optionally, the user may select the files that match or satisfy at least one criterion, which is defined explicitly or user-defined. By way of example, and in no way limiting the scope of the present invention, one criterion may be a selection of all the files archived in a particular time range, as a result of a search operation and the like. Alternatively, each and every archived file may be selected in sequence without user input.

At step 215, the method determines a source location for the selected file. More specifically, the method 200 accesses the metadata associated with the selected archived file to find its source location, i.e., the location where the file was originally stored in the client computer memory. The source location is information in the metadata of the archived file. The source location may be an absolute location, e.g., a memory address, or a relative location within a file system, e.g., relative to directories, folders and other files.

In general, there are two distinct classes of metadata: structural or control metadata and guide metadata. Structural metadata is used to describe the structure of computer systems such as tables, columns and indexes. Guide metadata is used to help humans find specific items and is usually expressed as a set of keywords in a natural language. Assortments of metadata types are known, such as relational database metadata, data warehouse metadata, business intelligence metadata, general IT metadata, IT metadata management products, file system metadata, image metadata, program metadata, document metadata, metamodels, strange metadata, digital library metadata, geospatial metadata and the like.

Reiterating again, the archive contains details of every item archived. It also typically stores the source identification of the item, the item size, date and such other properties. All this information from the archive can be used to regenerate the placeholders. The placeholders for the items in the archive can thus be recreated solely from the information in the archive, without restoring the archived files.

At step 220, the method recreates a placeholder from the file and its metadata such that the placeholder is recreated at the source location in the memory of the client. From the selected file and its metadata, the method recreates the placeholder including archive id, item id, checksum and the like. The same method can be used for other types of stubs: URLs, shortcuts, and the like.

At step 225, the method 200 queries whether another archived file is to be processed to regenerate a placeholder. If affirmatively answered, the method 200 proceeds to step 205 to select the next file. If negatively answered, the method 200 ends at step 230.

The invention is intended to cover all equivalent embodiments, and is limited only by the appended claims. Various other embodiments are possible within the spirit and scope of the invention. While the invention may be susceptible to various modifications and alternative forms, the specific embodiments have been shown by way of example in the drawings and have been described in detail herein. The aforementioned specific embodiments are meant to be for explanatory purposes only, and not intended to delimit the scope of the invention. Rather, the invention is to cover all modifications, equivalents, and alternatives falling within the spirit and scope of the invention as defined by the following appended claims.

What is claimed is:

1. A computer-implemented method, executed on a computer, comprising:
   selecting at least one object of information, wherein
      the at least one object of information is in an archive;
   determining a source location for the at least one object of information by accessing metadata, using the computer, wherein
      the metadata is related to the at least one object of information,
      an original placeholder for the at least one object of information had been created and placed at the source location, when the at least one object of information was migrated into the archive,
      the original placeholder was a stub file that replaced the contents of the at least one object of information, and
      the original placeholder comprised at least
         an archive identifier,
         an item identifier, and
         a checksum; and
   recreating a placeholder for the at least one object of information, using the computer, wherein
      the placeholder is recreated at the source location, and
      the placeholder is recreated using the metadata.

2. The computer-implemented method of claim 1, wherein the archive comprises:
   metadata related to each object of information stored therein, wherein
      the metadata related to the each object of information stored therein comprises the metadata.
3. The computer-implemented method of claim 2, wherein the metadata comprises:
   a source location identifier that identifies a location for storage of the placeholder.
4. The computer-implemented method of claim 1, wherein
   the placeholder is located on a first computer, and
   the archive is located on a second computer.
5. The computer-implemented method of claim 4, wherein the second computer comprises a storage system.
6. The computer-implemented method of claim 1, wherein the at least one object of information is an at least one file.
7. A computer system comprising:
   a processor;
   a computer-readable medium, coupled to said processor; and
   instructions, encoded in said computer-readable medium, for recreating a placeholder for an archived object of information and configured to cause said processor to store at least one object of information, wherein
      the at least one object of information is configured to be selected for processing,
      determine a source location for the at least one object of information by accessing metadata, wherein
      the metadata is related to the at least one object of information,
      an original placeholder for the at least one object of information had been created and placed at the source location, when the at least one object of information was migrated into the archive,
      the original placeholder was a stub file that replaced the contents of the at least one object of information, and
      the original placeholder comprised at least
         an archive identifier,
         an item identifier, and
         a checksum, and
      recreate a placeholder for the at least one object of information, wherein
      the placeholder is recreated at the source location, and
      the instructions configured to cause said processor to recreate the placeholder are configured to use
         the metadata, and
         the at least one object of information.
8. The computer system of claim 7, wherein the instructions configured to cause said processor to store the at least one object of information further comprise instructions configured to cause said processor to:
   store metadata related to each object of information of a plurality of object of information, wherein
      the plurality of object of information comprise the at least one object of information, and
      the metadata related to the each object of information comprises the metadata.
9. The computer system of claim 8, wherein the metadata comprises:
   a source location identifier that identifies a location for storage of the placeholder.
10. The computer system of claim 7, wherein
    the placeholder is located on a first computer, and
    the archive is located on a second computer.

11. The computer system of claim 10, wherein the second computer comprises a storage system.
12. The computer system of claim 7, wherein the at least one object of information is at least one file.
13. An apparatus comprising:
    an archive, wherein
       the archive is located in a first computer, and
       the archive is configured to store at least one object of information that is selected for processing; and
    a placeholder recreation module, wherein
       the placeholder recreation module is located in a second computer,
       the first computer and second computer are coupled by a communications network, and
       the placeholder recreation module is configured to
          determine a source location for the at least one object of information by accessing metadata, wherein
          the metadata is related to the at least one object of information,
          an original placeholder for the at least one object of information had been created and placed at the source location, when the at least one object of information was migrated into the archive,
          the original placeholder was a stub file that replaced the contents of the at least one object of information, and
          the original placeholder comprised at least
             an archive identifier,
             an item identifier, and
             a checksum, and
          recreate a placeholder for the at least one object of information,
          the placeholder is recreated at the source location, and
          the placeholder recreation module is configured to recreate the placeholder using
             the metadata, and
             the at least one object of information.
14. A non-transitory computer-readable medium containing instructions that, when executed by a processor, cause the processor to perform a method comprising:
    selecting at least one object of information, wherein
       the at least one object of information is in an archive;
    determining a source location for the at least one object of information by accessing metadata, wherein
       the metadata is related to the at least one object of information,
       an original placeholder for the at least one object of information had been created and placed at the source location, when the at least one object of information was migrated into the archive,
       the original placeholder was a stub file that replaced the contents of the at least one object of information, and
       the original placeholder comprised at least
          an archive identifier,
          an item identifier, and
          a checksum; and
    recreating a placeholder for the at least one object of information, wherein
       the placeholder is recreated at the source location, and
       the placeholder is recreated using the metadata,
       the original placeholder is created when an object of information is migrated into the archive.

* * * * *